US009343107B2

(12) United States Patent
Burness (10) Patent No.: US 9,343,107 B2
(45) Date of Patent: May 17, 2016

(54) WINDAGE CONTROL IN A DUAL SPINDLE STORAGE DEVICE HAVING INTERLEAVED STORAGE MEDIA

(75) Inventor: John O. Burness, Colorado Springs, CO (US)

(73) Assignee: SEAGATE TECHNOLOGY LLC, Scotts Valley, CA (US)

( * ) Notice: Subject to any disclaimer, the term of this patent is extended or adjusted under 35 U.S.C. 154(b) by 1498 days.

(21) Appl. No.: 12/622,662

(22) Filed: Nov. 20, 2009

(65) Prior Publication Data

US 2011/0122528 A1   May 26, 2011

(51) Int. Cl.
*G11B 25/04* (2006.01)

(52) U.S. Cl.
CPC .................... *G11B 25/043* (2013.01)

(58) Field of Classification Search
CPC .................................................. G11B 25/043
USPC ...................................................... 360/246.7
See application file for complete search history.

(56) References Cited

U.S. PATENT DOCUMENTS

| | | | | |
|---|---|---|---|---|
| 3,553,662 A | * | 1/1971 | Goss | 360/78.05 |
| 3,864,747 A | * | 2/1975 | Pejcha | 360/97.03 |
| 3,864,750 A | * | 2/1975 | Applequist | 360/264.1 |
| 3,984,873 A | * | 10/1976 | Pejcha | 360/254.3 |
| 4,019,205 A | * | 4/1977 | Salmond et al. | 360/98.06 |
| 5,134,530 A | | 7/1992 | Hall | |
| 6,208,485 B1 | * | 3/2001 | Chainer et al. | 360/98.07 |
| 6,462,901 B1 | | 10/2002 | Tadepalli | |
| 6,483,660 B1 | * | 11/2002 | Akagi et al. | 360/98.01 |
| 6,751,049 B2 | | 6/2004 | Tadepalli et al. | |
| 7,054,103 B2 | | 5/2006 | Tradepalli et al. | |
| 2006/0152847 A1 | | 7/2006 | Stiles et al. | |

FOREIGN PATENT DOCUMENTS

| | | | | | |
|---|---|---|---|---|---|
| JP | 56080859 A | * | 7/1981 | | G11B 25/04 |
| JP | 01311490 A | * | 12/1989 | | G11B 25/04 |
| JP | 03073482 A | * | 3/1991 | | G11B 25/04 |

* cited by examiner

*Primary Examiner* — David D Davis
(74) *Attorney, Agent, or Firm* — Hall Estill Attorneys At Law (57) ABSTRACT

An apparatus and associated method are provided whereby first and second spindles operably rotate first and second overlapping storage discs, respectively. First and second data transfer members are operably disposed adjacent storage areas of the respective storage discs. An edge of the first disc moves in a prescribed close spatial separation from a rotating surface of the second spindle so that the second spindle strips windage, generated by the rotation of the first disc, away from the second data transfer member.

23 Claims, 6 Drawing Sheets

WINDAGE CONTROL IN A DUAL SPINDLE STORAGE DEVICE HAVING INTERLEAVED STORAGE MEDIA

FIELD

The present embodiments relate generally to data storage devices.

BACKGROUND

Data storage devices are commonly used in a multitude of computer environments to store large amounts of data in a form that is readily available to a user. A disc drive, for example, has a storage disc that is rotated by a motor at high speeds. The disc drive may have a disc stack of two or more storage discs that are fixed together in rotation. Each disc has a data storage surface where data is stored. A data transfer member is moved to selected positions adjacent the data storage surface in reading data from and writing data to the disc.

A continuing trend in the industry for data storage devices is toward ever-increasing data storage capacity and processing speed while maintaining or reducing the physical size of the data storage device enclosure. Consequently, the data transfer member and supporting structures are continually being miniaturized, and areal density of the storage surface is continually being increased.

It is to novel and nonobvious improvements in the art for supporting that goal of more storage capacity in a smaller enclosure that the present embodiments are directed.

SUMMARY

The present embodiments are generally directed to data storage devices.

In some embodiments an apparatus is provided that has first and second spindles operably rotating first and second overlapping storage discs, respectively. The apparatus also has first and second data transfer members that are operably adjacent storage areas of the respective storage discs. An edge of the first disc moves in a prescribed close spatial separation from a rotating surface of the second spindle, operably providing a minimum non-contacting clearance between the disc edge and the second spindle rotating surface so that the second spindle strips windage, generated by the rotation of the first disc, away front the second data transfer member.

In some embodiments a data storage device is provided that has a base defining an arcuate shroud surface. A first spindle operably rotates a first disc so that an edge of the first disc maintains a prescribed close spatial separation from the shroud surface. A second spindle operably rotates a second disc so that an edge of the second disc maintains the prescribed close spatial separation from a rotating surface of the first spindle.

In some embodiments a method is provided that includes the steps of obtaining a storage device having first and second non-coaxial spindles each operably rotating a storage disc; rotating the first storage disc in a data transfer relationship with a data transfer member; and rotating the second storage disc so that an edge of the second storage disc moves in a prescribed close spatial separation from a rotating surface of the first spindle so that the first spindle strips windage, generated by rotation of the second disc, away from the data transfer member.

DETAILED DESCRIPTION

Figure 1:
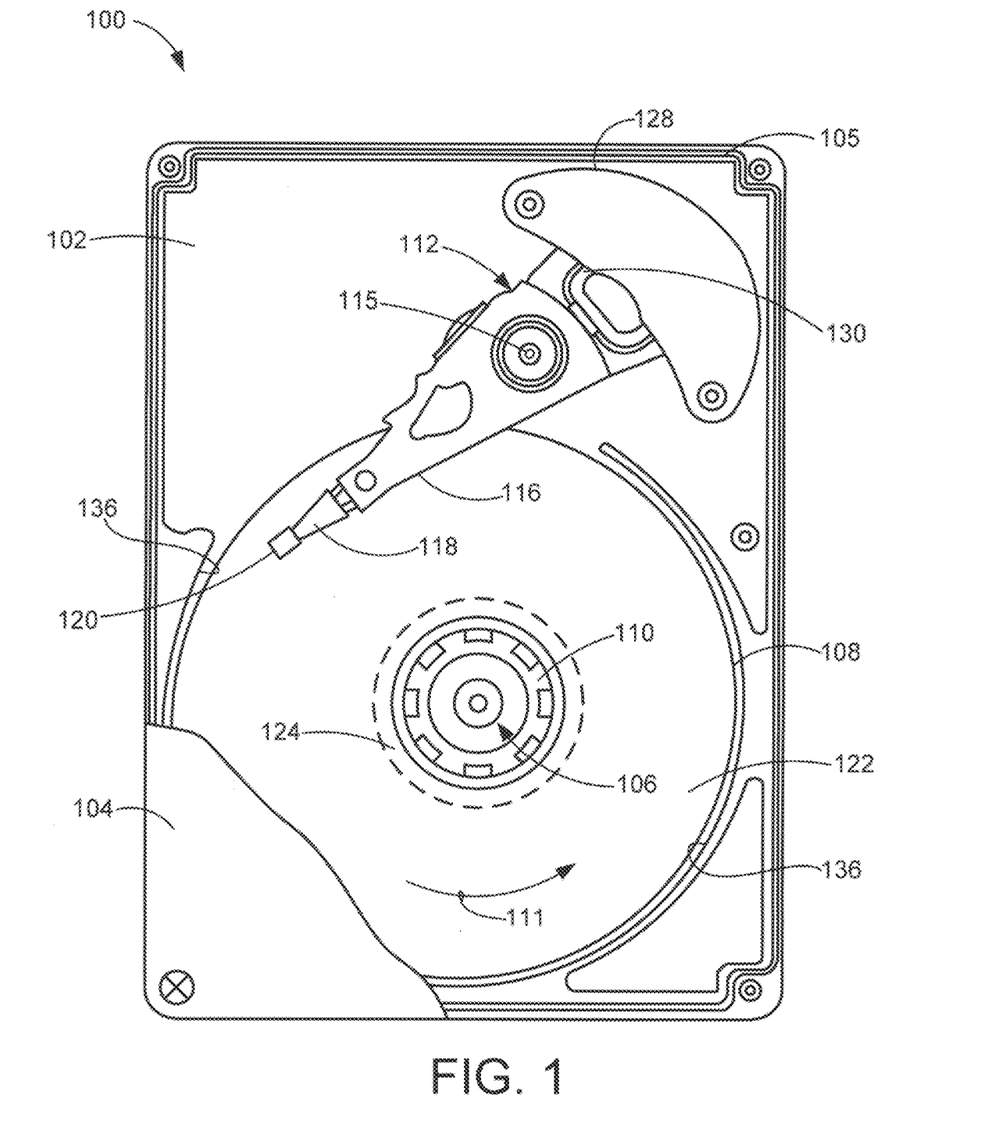
FIG. 1 depicts a data storage device that is constructed in accordance with related art.

In order to set forth a detailed description of various embodiments of the present invention, reference is first made to FIG. 1 which depicts a related art device in the form of a disc drive 100 that is used to store computer data. Although the disc drive 100 is used for purposes of the following description, the claimed embodiments are not so limited. The embodiments described herein can be employed advantageously in a multitude of different devices such as but not limited to optical devices and hybrid devices, and the like. An enumeration of all such types of devices suited for use in practicing the claimed embodiments is not necessary for the skilled artisan to understand the scope of the claimed subject matter.

The disc drive 100 includes a base 102 to which various disc drive components are mounted, and a cover 104 (partially cut-away) which together with the base deck 102 and a perimeter gasket 105 form an enclosure providing a sealed internal environment for the disc drive 100. Mounted to the base 102 is a spindle 106 to which one or more discs 108 are stacked and secured by a clamp ring 110 for rotation at a high speed. In these illustrative embodiments the discs rotate in a counter-clockwise direction as denoted by arrow 111, although the scope of the present embodiments is not so limited. Where a plurality of discs 108 is stacked to form a disc stack, adjacent discs 108 are typically separated by a disc spacer (depicted in FIG. 3). An actuator 112 pivots around a pivot bearing 115 in a plane parallel to the discs 108. The actuator 112 has actuator arms 116 (only one shown in FIG. 1) that support load arms 118 in travel across the discs 108 as the actuator arms 116 move within the spaces between adjacent discs 108. The load arms 118 are flex members that support data transfer members, such as read/write heads 120, with each of the read/write heads 120 operatively interfacing a surface of one of the discs 108 and maintained in a data reading and writing spatial relationship by a slider (not shown) which operably supports the read/write head 120 on an air bearing sustained by windage currents generated by the spinning discs 108.

Each of the discs 108 has a data storage region that includes a data recording surface 122 divided into concentric data tracks, whether circular or spiral shaped. Each of the read/write heads 120 operatively interfaces a respective desired data track to read data from or write data to the data track. The data recording surface 122 can be bounded inwardly by a circular landing zone 124 where the read/write heads 120 can come to rest against the respective discs 108 at times when the discs 108 are not spinning. Alternatively, the landing zone can be located elsewhere on the disc 108, or the read/write heads 120 can be unloaded to a ramp.

The actuator 112 is positioned by a voice coil motor (VCM) 128 comprising an electrical coil 130 and a magnetic circuit source. The magnetic circuit source conventionally comprises one or more magnets supported by magnetic poles to complete the magnetic circuit. When controlled current is passed through the actuator coil 130, an electromagnetic field is set up which interacts with the magnetic circuit causing the actuator coil 130 to move. As the actuator coil 130 moves, the actuator 112 pivots around the pivot bearing 115, causing the read/write heads 120 to travel across the discs 108.

As noted earlier, the spindle 106 rotates the discs 108 at a high speed as the read/write head 120 reads data from and writes data to the data storage surface 122. The kinetic energy of the spinning discs 108 transfers through the boundary layer at the disc/fluid interface, thereby inducing a rotational force component to the fluid in the disc stack. The fluid in the disc stack can be air, or in alternative embodiments it can be an inert gas such as helium. Centrifugal force imparts a radial force component on the fluid as well. These currents combine to produce an outwardly-spiraling windage that is eventually expelled from the disc stack. The windage currents gain velocity in moving radially outward because of the relatively faster linear speed of the disc 108 as the radial distance from the axis of rotation increases.

An upstanding arcuate shroud 136 circumscribes the discs 108 entirely except for a section that is cleared away to permit the pivotal movement of the actuator 112. Edges of the discs 108 move at a prescribed close spatial separation from the shroud 136. For purposes of this description and meaning of the appended claims, a "prescribed close spatial separation" is denoted by reference number 137 and is defined as the minimum clearance necessary to prevent contact at the expected total indicated runout of the mating parts. Here, the shroud 136 is stationary, so the prescribed close spatial separation is determined only with respect to the total indicated runout of the discs 108. The minimal clearance between the edges of the discs 108 and the shroud 136 best reduces the magnitude of aerodynamic excitation by the windage currents being expelled from the disc stack that can otherwise create adverse effects like disc flutter.

Numerous other details of construction are not included because they are well known to a skilled artisan and are unnecessary for an understanding of the scope of the claimed embodiments.

Figure 2:
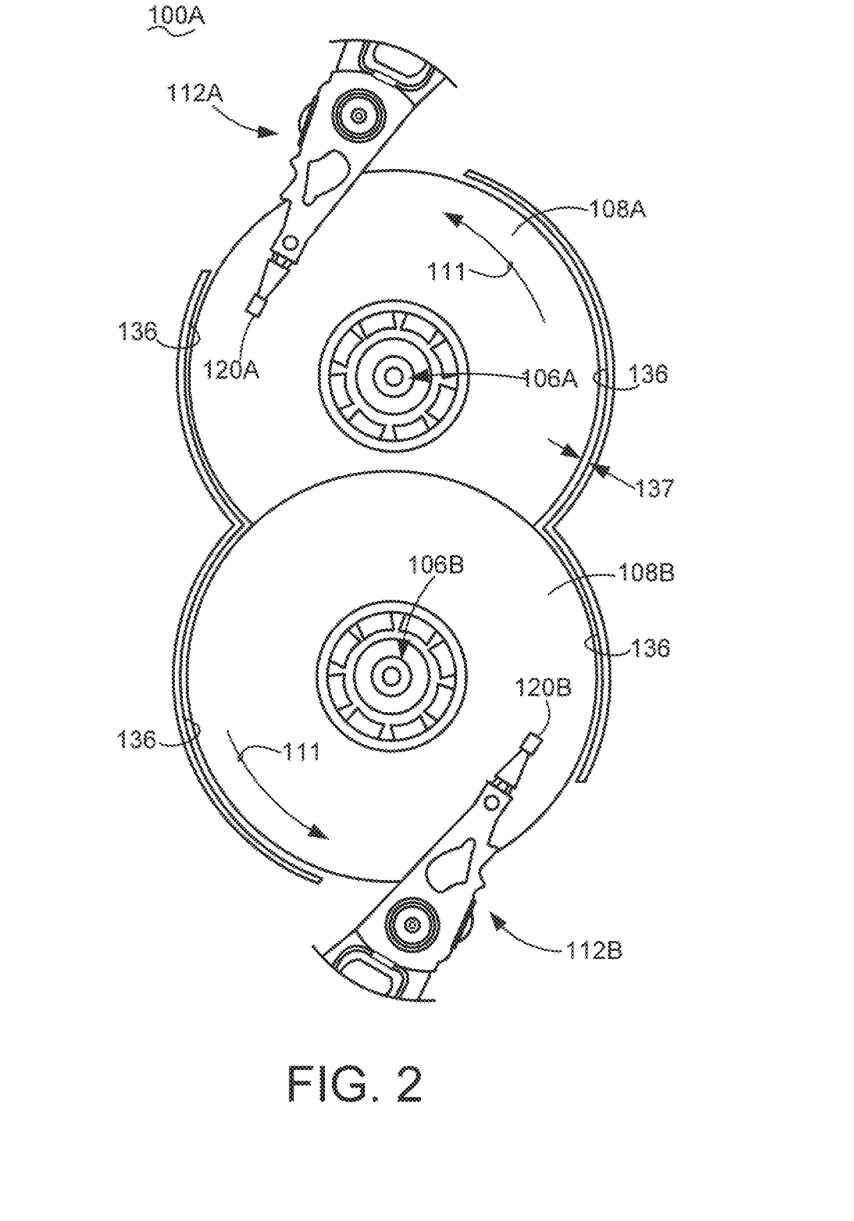
FIG. 2 depicts a portion of a data storage device similar to FIG. 1 in some ways but that is constructed in accordance with embodiments of the present invention.

FIG. 2 shows a portion of a data storage device 100A that is modified in accordance with embodiments of the present invention. Other aspects of the data storage device 100A are the same or similar to that described previously but modified as necessary in support of two-spindles instead of one. A first spindle 106A rotates a first disc (or multiple disc stack) 108A, and a second spindle 106B rotates an overlapping disc (or multiple disc stack) 108B. Dual actuators 112A, 112B move respective data transfer members 120A, 120B adjacent storage areas of the respective storage discs 108A, 108B. Edges of both discs 108A, 108B move in a close mating relationship with an upstanding arcuate shroud 136, which circumscribes the discs 108A, 108B except for where the discs 108A, 108B are overlapping and where clearance is necessary for actuator 112A, 112B pivotal movement. Although not depicted, in some embodiments a drop-in shroud segment can be added after the actuator 112A, 112B is operably merged with the disc stack 108A, 108B to effectively further extend the shroud 136.

Figure 3:
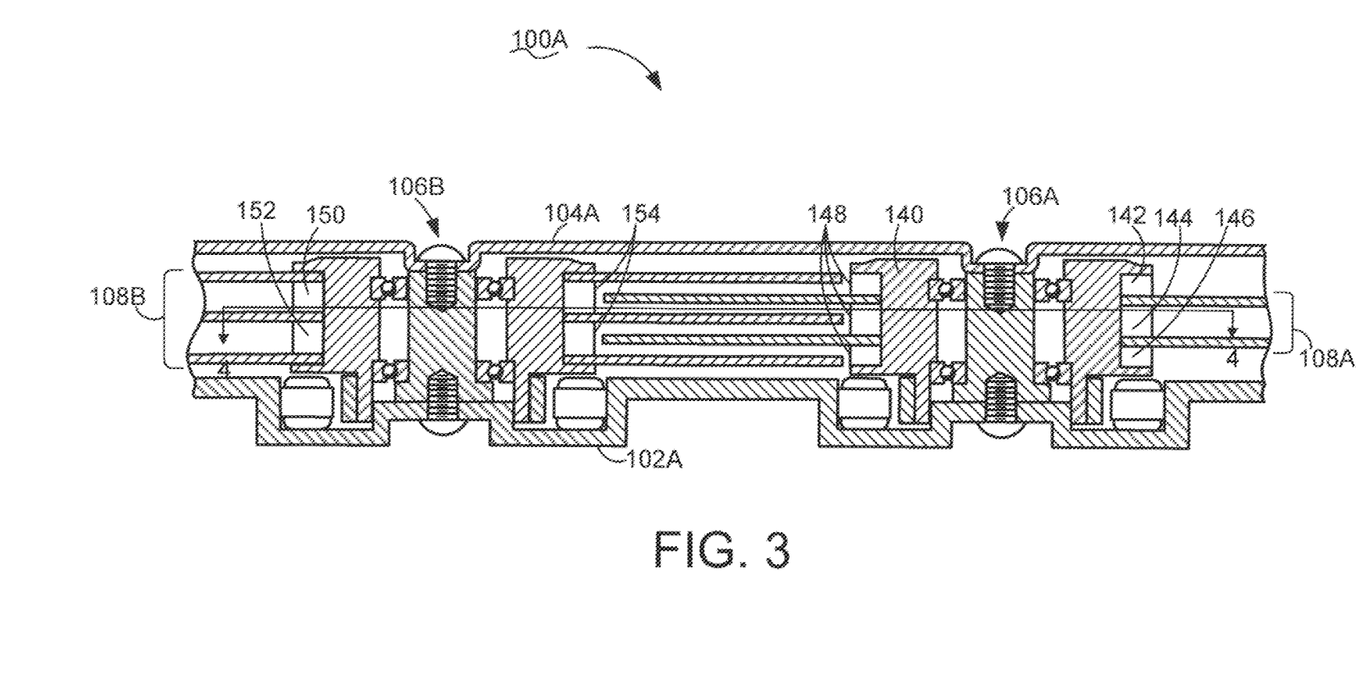
FIG. 3 is a partial cross sectional depiction of a data storage device constructed in accordance with the embodiments of FIG. 2.

FIG. 3 is a partial cross sectional view of the dual disc stack embodiments of FIG. 2 inside the enclosure made up of the cover 104A joined to the base 102A. For purposes of illustration the disc stack 108A is depicted as having two stacked discs and the disc stack 108B has three stacked discs. In the embodiments of FIG. 3 the disc stacks 108A, 108B are interleaved, but the present embodiments are not so limited. Also, FIG. 3 is diagrammatical with respect to the depicted spacings between adjacent discs 108; the depicted spacings are exaggerated only for clarity sake. Those spacings are operably minimized in order to pack and overlap more than the five discs in the data storage device 100A as desired to satisfy total storage requirements.

The spindle 106A has a rotating hub 140 to which the discs 108A and spacers 142, 144, 146 are fixed in rotation therewith. The spacers 142, 144, 146 define a rotating surface 148. Edges of each of the discs in the disc stack 108B move in a close mating relationship with the rotating surface 148 of the spindle 106A. Similarly, the spindle 106B has spacers 150, 152 that define a rotating surface 154. Edges of each of the discs in the disc stack 108A move in the prescribed close spatial separation 137 from the rotating surface 154 of the spindle 106B. However, in this case the total indicated runnout of both the disc 108 and the respective rotating surface 148, 154 must be considered in determining the value for the prescribed close spatial separation 137.

Figure 4:
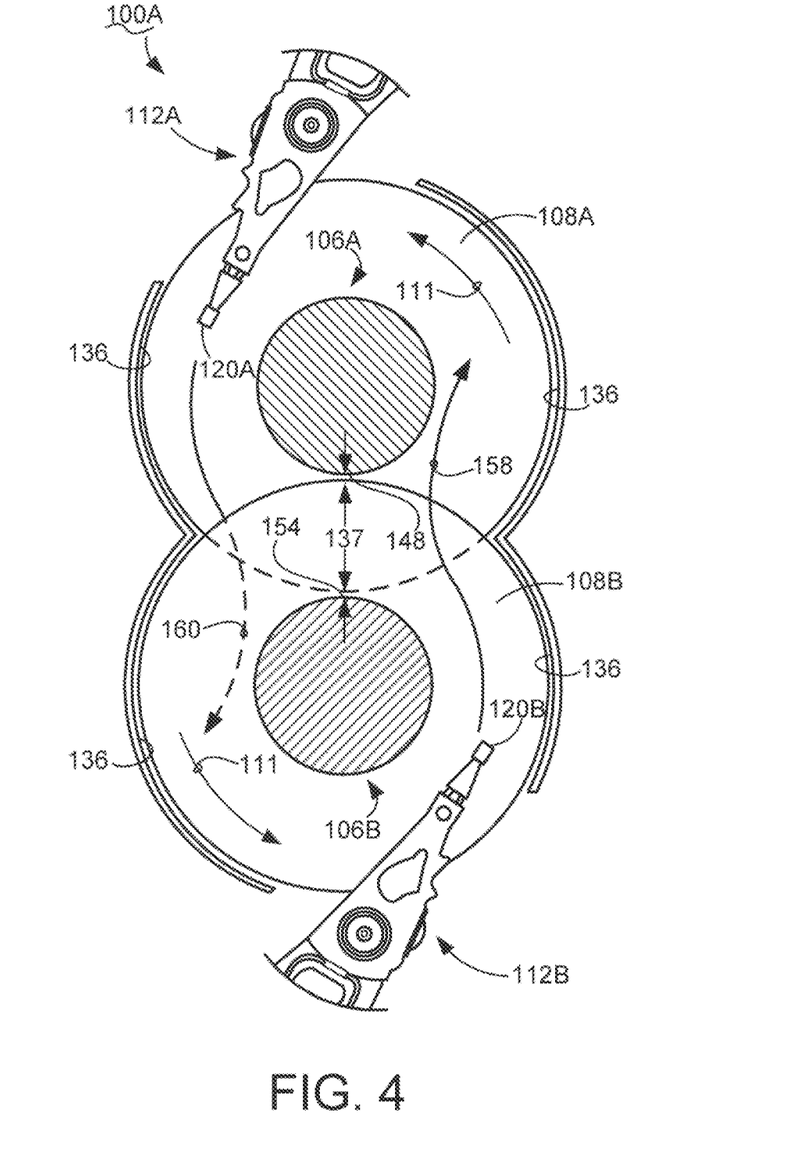
FIG. 4 is a partial cross sectional depiction taken along the line 4-4 in FIG. 3.

FIG. 4 is a partial cross sectional depiction taken along the line 4-4 of FIG. 3, depicting the manner in which the rotating surface 148 strips windage that is generated by the rotation of the disc 108B away from the data transfer member 120A. Windage currents generally denoted by arrow 158 are diverted, or stripped away, from the outwardly spiraling path by a high pressure zone created by the prescribed close spatial separation (minimal clearance) 137 between the edge of disc 108B and the rotating surface 148 of spindle 106A. Likewise, windage currents generally denoted by arrow 160 are stripped away from the data transfer member 120B by a similar high pressure zone created by the prescribed close spatial separation (minimal clearance) 137 between the edge of disc 108A and rotating surface 154 of spindle 106B.

Figure 5:
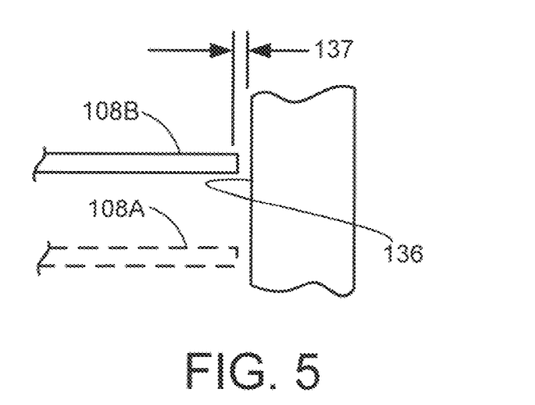
FIG. 5 depicts the prescribed close spatial separation between the discs and the shroud in embodiments of the present invention.
Figure 6:
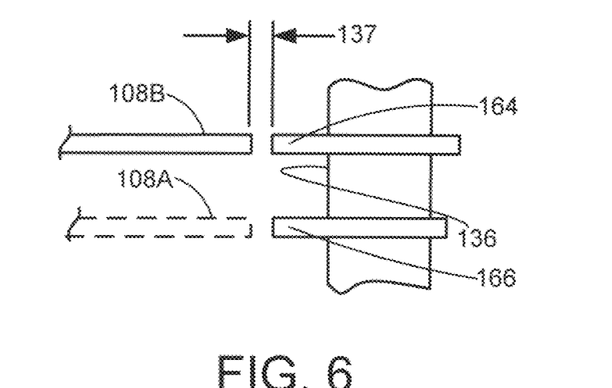
FIG. 6 depicts the prescribed close spatial separation between the discs and the shroud in alternative embodiments of the present invention.

FIG. 5 is an enlarged depiction of the prescribed close spatial separation 137 between each of the discs 108 and the upstanding shroud 136 as described above. The outwardly spiraling currents shed vortices from opposing surfaces of the disc that can couple beyond the disc edge to aerodynamically excite the disc. The adverse effects of shedding vortices can be alleviated by the alternative embodiments of FIG. 6 where the shroud 136 defines protuberant features 164, 166 that are substantially coextensive with the respective discs 108A. 108B. By "substantially coextensive" it is meant that the protuberant features 164, 166 have top and bottom surfaces (as viewed in FIG. 6) that are substantially coplanar with the top and bottom surfaces of the respective discs 108A, 108B, such that the protuberant feature is effectively an extension of the disc 108A, 108B but for the prescribed close spatial separation 137. The arrangement of FIG. 6 lessens adverse impacts of shedding vortices by guiding the expelled windage currents away from the disc edge.

Figure 7:
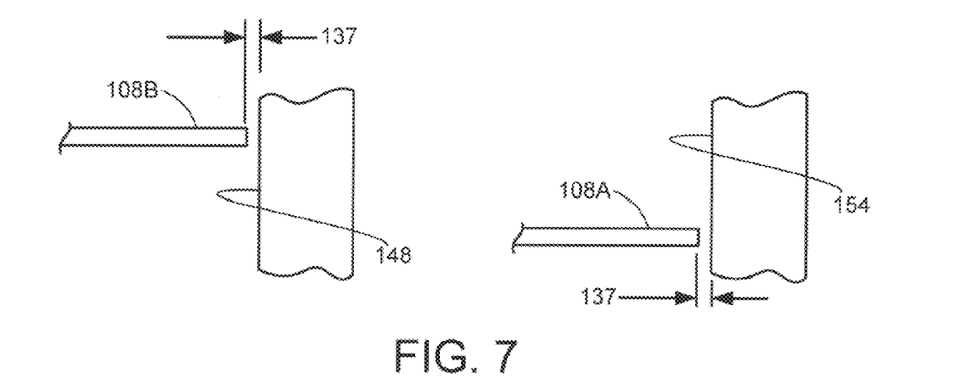
FIG. 7 depicts the prescribed close spatial separation between the discs and the spindle rotating surface in embodiments of the present invention.
Figure 8:
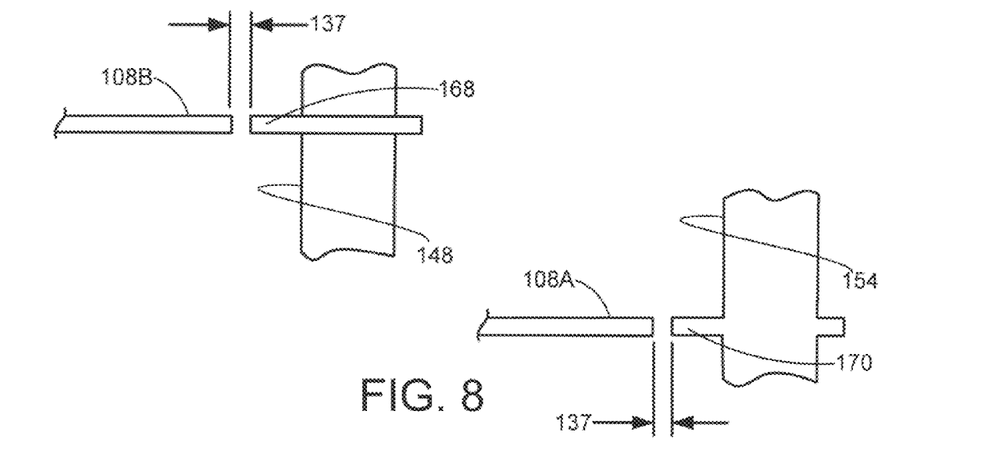
FIG. 8 depicts the prescribed close spatial separation between the discs and the spindle rotating surface in alternative embodiments of the present invention.

Similarly, FIG. 7 is an enlarged depiction of the prescribed close spatial separation 137 between the edges of the discs 108A, 108B and the rotating surfaces 148, 154 of the spindles 106A, 106B, respectively. For the same reasons as previously described, FIG. 8 depicts alternative embodiments in which the rotating surfaces 148, 154 define protuberant features 168, 170 that are sized to be substantially coextensive with the discs 108A, 108B, respectively.

The foregoing describes details of an apparatus constructed in accordance with various embodiments of the present invention. The claimed embodiments also contemplate an associated method that includes the step of obtaining a storage device having first and second non-coaxial spindles each operably rotating a storage disc. The method proceeds by rotating the first storage disc in a data transfer relationship with a data transfer member. Furthermore, the method includes rotating the second storage disc so that an edge of the second storage disc moves in a close mating relationship with a rotating surface of the first spindle, so that the first spindle strips windage, generated by rotation of the second disc, away from the data transfer member.

The present embodiments therefore include unexpected and novel advantages as detailed herein and as can be further appreciated by the skilled artisan from the claims, figures, and description. Although some of the embodiments are described in reference to a data storage system, or even to a data storage device, the skilled artisan recognizes without enumeration that the claimed invention has various other embodiments with application to other devices as well that have excitation-sensitive components.

It is to be understood that even though numerous characteristics and advantages of various illustrative embodiments of the invention have been set forth in the foregoing description, together with details of the structure and function of various embodiments of the invention, this disclosure is illustrative only, and changes may be made in detail, especially in matters of structure and arrangement of parts within the principles of the present embodiments, to the full extent indicated by the broad, general meaning of the terms in which the appended claims are expressed. It will be appreciated by those skilled in the art that the teachings of the present embodiments can be applied to a family of systems, devices, and means encompassed by and equivalent to the examples of embodiments described, without departing from the scope and spirit of the claimed embodiments. Further, still other applications for various embodiments, including embodiments particularly pertaining to solid state data storage systems and hybrid storage systems are included within the claimed embodiments.

What is claimed:

1. An apparatus comprising a first spindle operably rotating a first storage disc and a second spindle operably rotating a second storage disc overlapping the first storage disc, and first and second data transfer members operably adjacent storage areas of the respective storage discs, an edge of the first disc operably moving in a prescribed close spatial separation from an operably rotating surface of the second spindle so that the second spindle strips windage, generated by the rotation of the first disc, away from the second data transfer member.

2. The apparatus of claim 1 wherein the prescribed close spatial separation is also operably maintained between edges of at least one of the storage discs and an arcuate shroud surface, thereby operably providing a minimum non-contacting clearance between the disc edge and the shroud surface.

3. The apparatus of claim 2 wherein the shroud surface defines first and second protuberant features that are sized to be substantially coextensive with the respective discs.

4. The apparatus of claim 2 wherein the second spindle rotating surface defines a third protuberant feature that is sized to be substantially coextensive with the first disc.

5. The apparatus of claim 2 wherein an edge of the second disc moves in the prescribed close spatial separation with a rotating surface of the first spindle so that the first spindle strips windage, generated by the rotation of the second disc, away from the first data transfer member.

6. The apparatus of claim 5 wherein the shroud surface defines first and second protuberant features that are sized to be substantially coextensive with the respective discs.

7. The apparatus of claim 5 wherein the second spindle rotating surface defines a third protuberant feature that is sized to be substantially coextensive with the first disc.

8. The apparatus of claim 5 wherein the first spindle rotating surface defines a fourth protuberant feature that is sized to be substantially coextensive with the second disc.

9. The apparatus of claim 5 wherein the shroud surface defines first and second protuberant features that are sized to be substantially coextensive with the respective discs, the second spindle rotating surface defines a third protuberant feature that is sized to be substantially coextensive with the first disc, and the first spindle rotating surface defines a fourth protuberant feature that is sized to be substantially coextensive with the second disc.

10. The apparatus of claim 5 wherein the first spindle rotates a first plurality of discs and the second spindle rotates a second plurality of discs, wherein the prescribed close spatial separation is operably maintained between an edge of each of the first plurality of discs and the second spindle rotating surface and between an edge of each of the second plurality of discs and the first spindle rotating surface.

11. The apparatus of claim 10 wherein the first plurality of discs and the second plurality of discs are interleaved.

12. The apparatus of claim 1 wherein the first and second discs operably rotate in the same direction.

13. A data storage device, comprising:
a base defining an arcuate shroud surface;
a first spindle operably rotating a first disc so that an edge of the first disc maintains a prescribed close spatial separation from the shroud surface; and
a second spindle operably rotating a second disc so that an edge of the second disc maintains the prescribed close spatial separation from a rotating surface of the first spindle.

14. The data storage device of claim 13 further comprising first and second data transfer members operably adjacent storage areas of the respective discs, wherein the first spindle operably strips windage, generated by the rotation of the second disc, away from the first data transfer member.

15. The data storage device of claim 14 wherein the shroud surface defines first and second protuberant features that are sized to be substantially coextensive with the respective discs.

16. The data storage device of claim 14 wherein an edge of the first disc rotates in the prescribed close spatial separation with a rotating surface of the second spindle so that the second spindle strips windage, generated by the rotation of the first disc, away from the second data transfer member.

17. The data storage device of claim 16 wherein the shroud surface defines first and second protuberant features that are sized to be substantially coextensive with the respective discs, the second spindle rotating surface defines a third protuberant feature that is sized to be substantially coextensive with the first disc, and the first spindle rotating surface defines a fourth protuberant feature that is sized to be substantially coextensive with the second disc edge.

18. The data storage device of claim 16 wherein the first spindle rotates a first plurality of discs and the second spindle rotates a second plurality of discs, and wherein the prescribed close spatial separation is operably maintained between an edge of each of the first plurality of discs and the second spindle rotating surface and between an edge of each of the second plurality of discs and the first spindle rotating surface.

19. The apparatus of claim 18 wherein the first plurality of discs and the second plurality of discs are interleaved.

20. The data storage device of claim 13 wherein the first spindle rotating surface defines a third protuberant feature that is sized to be substantially coextensive with the second disc.

21. The data storage device of claim 13 wherein the first and second discs operably rotate in the same direction.

22. An apparatus comprising:
first and second storage discs that are not coaxial;
a spindle to operatively rotate the first storage disc; and
a data transfer member associated with the first storage disc, wherein an edge of the second storage disc moves in a prescribed close spatial separation from a rotating surface of the spindle, thereby operably providing a minimum non-contacting clearance between the edge and the spindle rotating surface so that the spindle strips windage, generated by the rotation of the second disc, away from the data transfer member.

23. An apparatus comprising a first spindle operably rotating a first storage disc and a second spindle operably rotating a second storage disc that overlaps the first storage disc, and first and second data transfer members operably adjacent storage areas of the respective storage discs, wherein an edge of the first disc operably moves in a prescribed close spatial separation from an arcuate shroud and simultaneously operably moves in the prescribed close spatial separation from a surface of the second spindle.

* * * * *